US008051080B2

(12) United States Patent
Kraft et al.

(10) Patent No.: US 8,051,080 B2
(45) Date of Patent: Nov. 1, 2011

(54) CONTEXTUAL RANKING OF KEYWORDS USING CLICK DATA

(75) Inventors: Reiner Kraft, Gilroy, CA (US); Utku Irmak, Santa Clara, CA (US); Vadim Von Brzeski, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 404 days.

(21) Appl. No.: 12/132,071

(22) Filed: Jun. 3, 2008

(65) Prior Publication Data

US 2009/0265338 A1    Oct. 22, 2009

Related U.S. Application Data

(60) Provisional application No. 61/045,483, filed on Apr. 16, 2008.

(51) Int. Cl.
*G06F 7/00* (2006.01)
*G06F 17/30* (2006.01)

(52) U.S. Cl. ........................................ 707/736; 707/748
(58) Field of Classification Search ................. None
See application file for complete search history.

(56) References Cited

U.S. PATENT DOCUMENTS

| | | |
|---|---|---|
| 5,619,709 A | 4/1997 | Caid et al. |
| 5,771,378 A | 6/1998 | Holt et al. |
| 5,835,087 A | 11/1998 | Herz et al. |
| 5,895,470 A | 4/1999 | Pirolli et al. |
| 6,018,738 A | 1/2000 | Breese et al. |
| 6,049,776 A | 4/2000 | Donnelly et al. |
| 6,134,532 A | 10/2000 | Lazarus et al. |
| 6,169,992 B1 | 1/2001 | Beall et al. |
| 6,249,740 B1 | 6/2001 | Ito et al. |
| 6,327,590 B1 | 12/2001 | Chidlovskii et al. |
| 6,345,289 B1 | 2/2002 | Lotspiech et al. |
| 6,349,299 B1 | 2/2002 | Spencer et al. |

(Continued)

FOREIGN PATENT DOCUMENTS

WO    WO 01/11504    2/2001

OTHER PUBLICATIONS

Maglio et al. (2000), "LiveInfo: Adapting web experience by customization and annotation". In Proceedings of the 1st International Conference on Adaptive Hypermedia and Adaptive Web-based Systems, AH2000, Trento, Italy, Aug. 2000.*

(Continued)

*Primary Examiner* — Jay Morrison
(74) *Attorney, Agent, or Firm* — Hickman Palermo Truong & Becker LLP

(57) ABSTRACT

Techniques are provided for ranking the entities that are identified in a document based on an estimated likelihood that a user will actually make use of the annotations. According to one disclosed approach, usage data that indicates how users interact with annotations contained in documents presented to the users is collected. Based on the usage data, weights are generated for features of a feature vector. The weights are then used to modify feature scores of entities, and the modified feature scores are used to determine how to annotate documents. Specifically, a set of entities are identified within a document. A ranking for the identified entities is determined based, at least in part, on (a) feature vector scores for each of the identified entities, and (b) the weights generated for the features of the feature vector. The document is then annotated based, at least in part, on the ranking.

32 Claims, 3 Drawing Sheets

U.S. PATENT DOCUMENTS

| | | | |
|---|---|---|---|
| 6,446,065 | B1 | 9/2002 | Nishioka et al. |
| 6,564,209 | B1 | 5/2003 | Dempski et al. |
| 6,605,120 | B1 | 8/2003 | Fields et al. |
| 6,633,868 | B1 | 10/2003 | Min et al. |
| 6,701,311 | B2 | 3/2004 | Biebesheimer et al. |
| 6,785,670 | B1 | 8/2004 | Chiang et al. |
| 6,789,073 | B1 | 9/2004 | Lunenfeld |
| 6,859,807 | B1 | 2/2005 | Knight et al. |
| 6,931,397 | B1 | 8/2005 | Sundaresan |
| 6,947,930 | B2 | 9/2005 | Anick et al. |
| 6,961,731 | B2 | 11/2005 | Holbrook |
| 7,058,626 | B1 | 6/2006 | Pan et al. |
| 7,200,638 | B2 | 4/2007 | Lake |
| 7,409,402 | B1 | 8/2008 | Chan et al. |
| 7,421,426 | B2 * | 9/2008 | Berstis et al. .......... 1/1 |
| 7,467,349 | B1 * | 12/2008 | Bryar et al. ............ 715/205 |
| 2001/0037205 | A1 | 11/2001 | Joao |
| 2002/0004735 | A1 | 1/2002 | Gross |
| 2002/0072997 | A1 | 6/2002 | Colson et al. |
| 2002/0078029 | A1 | 6/2002 | Pachet |
| 2002/0081020 | A1 | 6/2002 | Shimazu |
| 2002/0092019 | A1 | 7/2002 | Marcus |
| 2002/0103798 | A1 * | 8/2002 | Abrol et al. ............. 707/5 |
| 2002/0105532 | A1 | 8/2002 | Oblinger |
| 2002/0124263 | A1 | 9/2002 | Yokomizo |
| 2003/0061200 | A1 | 3/2003 | Hubert et al. |
| 2003/0074369 | A1 * | 4/2003 | Schuetze et al. ........ 707/103 R |
| 2003/0135582 | A1 | 7/2003 | Allen et al. |
| 2003/0177059 | A1 | 9/2003 | Smorenburg et al. |
| 2003/0204530 | A1 | 10/2003 | Anderson et al. |
| 2003/0229893 | A1 | 12/2003 | Sgaraglino |
| 2003/0233224 | A1 | 12/2003 | Marchisio et al. |
| 2004/0002959 | A1 | 1/2004 | Alpert et al. |
| 2004/0100510 | A1 | 5/2004 | Milic-Frayling et al. |
| 2004/0133471 | A1 | 7/2004 | Pisaris-Henderson et al. |
| 2004/0193520 | A1 | 9/2004 | LaComb et al. |
| 2004/0199496 | A1 | 10/2004 | Liu et al. |
| 2004/0210468 | A1 | 10/2004 | Rubel et al. |
| 2005/0060311 | A1 | 3/2005 | Tong et al. |
| 2005/0102177 | A1 | 5/2005 | Takayama |
| 2005/0125354 | A1 | 6/2005 | Pisaris-Henderson et al. |
| 2005/0131894 | A1 | 6/2005 | Vuong |
| 2005/0149496 | A1 | 7/2005 | Mukherjee et al. |
| 2005/0160080 | A1 | 7/2005 | Dawson |
| 2005/0257045 | A1 | 11/2005 | Bushman et al. |
| 2006/0026013 | A1 | 2/2006 | Kraft |
| 2006/0036490 | A1 | 2/2006 | Sagalyn |
| 2006/0036570 | A1 | 2/2006 | Schaefer et al. |
| 2006/0069610 | A1 | 3/2006 | Rossini |
| 2006/0074726 | A1 | 4/2006 | Forbes et al. |
| 2006/0074853 | A1 | 4/2006 | Liu et al. |
| 2006/0074876 | A1 | 4/2006 | Kakivaya et al. |
| 2006/0116926 | A1 | 6/2006 | Chen |
| 2006/0149710 | A1 * | 7/2006 | Koningstein et al. ........ 707/3 |
| 2006/0242018 | A1 | 10/2006 | Shulman et al. |
| 2007/0150466 | A1 * | 6/2007 | Brave et al. ............. 707/5 |
| 2007/0168346 | A1 | 7/2007 | Markanthony et al. |
| 2007/0260448 | A1 | 11/2007 | Lorenzen et al. |
| 2008/0313119 | A1 * | 12/2008 | Leskovec et al. ......... 706/46 |
| 2009/0112857 | A1 | 4/2009 | Tong et al. |
| 2009/0125544 | A1 * | 5/2009 | Brindley .............. 707/102 |

OTHER PUBLICATIONS

Sugiyama, Kazunari et al., "Adaptive Web search based on user profile constructed without any effort from users", XP-002434325, International World Wide Web Conference, XX, XX, May 2004, 10 pages.

European Patent Office, "Supplementary European Search Report", application No. EP 05774749, dated Mar. 31, 2009, 7 pages.

Claims, application No. EP 05774749, 9 pages.

Almieda et al., "A Community-Aware Search Engine Department of Computer Science," WWW2004, May 17-22, 2004 (9 pages).

Bharat, K., "Search Pad: explicit capture of search context to support Web search," Proceedings 9th International World Wide Web Conference, May 15-19, 2000 (10 pages).

Budzik, J., "User Interactions with Everyday Applications as Context for Just-in-time Information Access," Proceedings of the 2000 International Conference on Intelligent User Interfaces, 2000 (8 pages).

Finkelstein et al, "Placing Search in Context: The Concept Revisited," WWW10, May 2-5, 2001 (13 pages).

Freyne et al., "Further Experiments on Collaborative Ranking in Community-Based Web Search," Artificial Intelligence Review 2004 (24 pages).

The Hyperwords Company, "The Hyperwords Project", located at http://www.hyperwords.net, retrieved on Jan. 15, 2007, copyright 2005/2006 (1 page).

Liberman, H., "Letizia: An agent that assists web browsing," IJCA1-95, Proceedings of the Fourteenth International Joint Conference on Artificial Intelligence, Aug. 20-25, 1995 (7 pages).

Mitra, M. et al., "Improving Automatic Query Expansion" Proceedings of AMC SIGIR, ACM Press, 1998 (9 pages).

Rhodes, B. et al., "Remembrance Agent: A continuously running automated information retrieval system", Proceedings of the First International Conference on the Practical Application of Intelligent Agents and Multi Agent Technology (PAAM 1996) 7 pages.

Vibrant Media, "IntelliTXT Words Engage", located at http://www.intellitxt.com, retrieved on Jan. 15, 2007, copyright 2006 (1 page).

Current claims for International Application No. PCT/US05/26184 (8 pages).

ISA/US Patent Cooperation Treaty, PCT "Notification of Transmittal of the International Search Report and the Written Opinion of the International Searching Authority, or the Declaration", PCT/US05/26184 dated Jul. 31, 2007 (9 pages).

Budzik, et al., "Anticipating Information Needs: Everyday Applications as Interfaces to Internet Information Resources", Proceedings of the 1998 World Conference of the WWW, AACE Press, 1998, 8 pages.

Budzik, et al., "User interactions with Everyday Applications as Context for Just-in-time Information Access", Proceedings of the 2000 International Conference on Intelligent User Interfaces, ACM Press, 2000, 7 pages.

Budzik, et al., "Information Access in Context", Knowledge Based Systems, Sep. 2001, 17 pages.

Budzik, et al., "Supporting on-line resource discovery in the context of ongoing tasks with proactive software assistants", International Journal of Human-Computer Studies, Jan. 2002, 27 pages.

Budzik, et al., "Anticipating and Contextualizing Information Needs", In Proceedings of the Sixty Second Annual Meeting of the American Society for Information Science, Learned Information Inc., 1999, 13 pages.

Dumais et al., "Optimizing Search by Showing results in Context", Mar. 31, 2001, ACM, pp. 1-8.

* cited by examiner

CONTEXTUAL RANKING OF KEYWORDS USING CLICK DATA

PRIORITY CLAIM AND RELATED CASES

The present application claims priority to U.S. provisional application No. 61/045,483, entitled "CONTEXTUAL RANKING OF KEYWORDS USING CLICK DATA", filed Apr. 16, 2008, the entire contents of which are incorporated herein by this reference.

The present application is also related to U.S. patent application Ser. No. 11/584,403, entitled "Contextual Syndication Platform", the entire contents of which are incorporated herein by this reference.

FIELD OF THE INVENTION

The present invention relates to ranking keywords and, more specifically, to ranking keywords based on click data.

BACKGROUND

U.S. patent application Ser. No. 10/903,283, filed on Jul. 29, 2004, discloses techniques for performing context-sensitive searches. According to one such technique, a "source" web page may be enhanced with user interface elements that, when activated, cause a search engine to provide search results that are directed to a particular topic to which at least a portion of the "source" web page pertains.

Because the user interface elements may be strategically positioned in a web page in close proximity to the content about which the user would want to search for information, the user interface elements provide a convenient mechanism for context-sensitive searching. A user can presume that, if he initiates a search using a user interface element that is positioned in close proximity to a particular paragraph of text, then the search results obtained for the search will be constrained based on the topics to which the paragraph pertains.

Beneficially, these user interface elements allow a user to search for resources that are related to a topic of interest within a web page that the user is currently viewing, at the time in which the user's interest in that topic is piqued. The user can locate related resources without redirecting his browser to a search engine portal page and, sometimes, without even formulating or typing any search query terms. Thus, these user interface elements enable the delivery of relevant information to a user at the point of the user's inspiration or curiosity.

Documents (e.g., web pages) often refer to named entities (e.g., recognized people, places, things, etc.) and concepts (e.g. objectivism, democracy, etc.). The named entities and concepts contained in a document are collectively referred to herein as the "entities" of the document. When reading a document that refers to an entity, the user may wish to obtain more information about that specific entity. U.S. patent application Ser. No. 11/584,403, entitled "Contextual Syndication Platform" describes a technique for providing, along with the rest of a document, operations, services, activities, and features that pertain to entities to which that document refers. The content from these services may be presented (e.g., in pop-up interfaces) to a user who is currently viewing that document.

U.S. patent application Ser. No. 11/584,403 also describes techniques that enable type-specific operations, services, activities, and features to be presented in conjunction with entities that are of the appropriate type. The set of operations, services, activities, and features that are presented in conjunction with an entity that is of a particular type is customized to contain operations, services, activities, and features that are appropriate to entities of the particular type, but which might not be appropriate to entities of other types. For example, presenting a "directions to" feature may be appropriate when the entity is a city, but not when the entity is a person.

An entity that has been identified within a document is referred to herein as an "identified entity". Once an entity has been identified, the document containing the entity is typically modified in a manner that distinguishes the identified entity from other content of the document. The process of modifying the document to distinguish identified entities is referred to as "annotating" the document.

There is any number of ways that a document may be annotated to distinguish identified entities. For example, assume that an entity identification system identifies "Statue of Liberty" as an entity within a document. To indicate that "Statue of Liberty" is an identified entity, the document may be annotated in a manner that turns the words "Statute of Liberty" into a hyperlink to additional content about the Statute of Liberty. Alternatively, the document may be annotated to make a pop-up appear when the cursor hovers over the words "Statue of Liberty". As yet another example, document may be annotated in a manner that causes the words "Statue of Liberty" to be bolded, or to cause a control to be displayed next to the words "Statue of Liberty".

Regardless of the specific manner in which documents are annotated to distinguish identified entities, the value of annotating a document must be weighed against the distractions that such annotations may cause. For example, the higher the density of identified entities in a document, the harder it may be to read the document. If a document contains too many annotations, the annotations may actually detract from the user experience, rather than enhance it.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
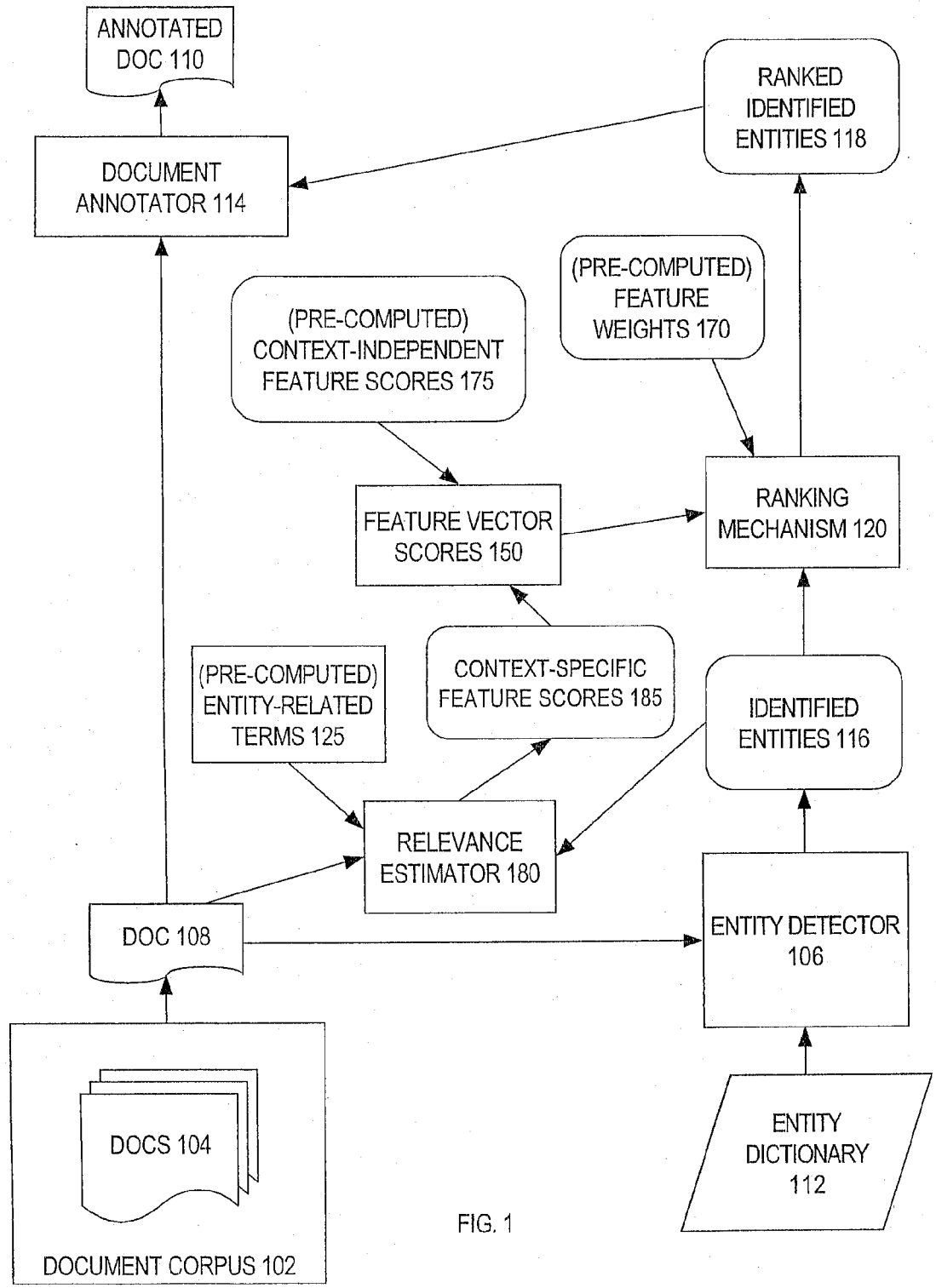
FIG. 1 is a block diagram of a system for annotating documents based on rankings assigned to entities identified within the documents, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

As mentioned above, the problem of automatically extracting the most interesting and relevant keyword phrases in a document has been studied extensively, as it is crucial for a number of applications. These applications include contextual advertising, automatic text summarization, and user-centric entity detection systems.

Techniques are provided herein for ranking the entities that are identified in a document based on an estimated likelihood that a user will actually make use of the annotations of the identified entities. Once the identified entities in a document have been ranked, the document is annotated in a manner that reflects the ranking. For example, in one embodiment, only those identified entities that satisfy certain ranking criteria (e.g. the "top 3" identified entities) may be annotated. In such an embodiment, the entities that are actually annotated in a document (the "annotated entities") are an automatically-selected subset of the identified entities in the document.

Instead of or in addition to annotating only a subset of the identified entities, the rankings may also be reflected in the visual appearance of the annotations (e.g. the higher the ranking of an identified entity, the bolder the font used for the text of the identified entity). There are any number of ways the rankings can be visually indicated, including color coding the identified entities, where the higher ranked identified entities are displayed at different colors than lower ranked identified entities. Alternatively, a number representing the actual ranking may be indicated with the annotation. As yet another alternative, the type and content of the annotation may vary with the ranking, where higher-ranked identified entities are annotated with more controls, or more options, or with information from more sources.

As shall be described in greater detail hereafter, a new feature space is defined to represent the interestingness of concepts, and the relevancy of the features are estimated for a given context. For example, in one embodiment, the rankings are established based on weights assigned to features of the identified entities, where the weights themselves are based on actual user interactions with previously-presented annotated pages.

Specifically, in one embodiment, click-through data is obtained from a large scale user-centric entity detection system. The click-through data indicates how frequently users made use of annotations in documents to which the users were exposed by the system. The click-through data thus obtained is used to train a model to establish weights for features associated with concepts based on the correlation between those features and the frequency that users made use of annotations associated with those concepts.

All applications involving automatic extraction of interesting and relevant keyword phrases in a document can potentially benefit from the techniques described herein, as the techniques enable computational efficiency (by decreasing the input size), noise reduction, or overall improved user satisfaction.

System Overview

FIG. 1 is a block diagram of a system that includes a ranking mechanism 120 that ranks entities identified in documents based on the likelihood that viewers of those documents will be interested in additional information about the entities. Referring to FIG. 1, an entity detector 106 uses an entity dictionary to detect entities that are contained in a document 108 that belongs to a document corpus 102 that includes many documents 104.

The identified entities 116 thus obtained are submitted to a ranking mechanism 120 that ranks the identified entities based, at least in part, on feature vector scores 150 associated with each of the entities, and feature weights 170 that apply to the features represented by the scores. In one embodiment, the feature vector scores 150 for each identified entity include both context-independent feature scores 175, and context-specific feature scores 185.

The context-specific feature scores 185 may include a relevance score generated for each identified entity by a relevance estimator 180. In one embodiment, relevance estimator 180 generates the relevance score for an entity/document combination by comparing terms in the document with terms associated the entity (entity-related terms 125). The relevance score for an entity/document combination reflects how relevant the identified entity is relative to the content of the document.

The ranked identified entities 118 are sent to a document annotator 114 which annotates document 108 in a manner that reflects the ranking of the entities. For example, annotator 114 may annotate only the three highest-ranked entities of document 108. The annotated document 110 that is created when document annotator 114 annotates document 108 may be stored, or directly delivered to a user.

Figure 2:
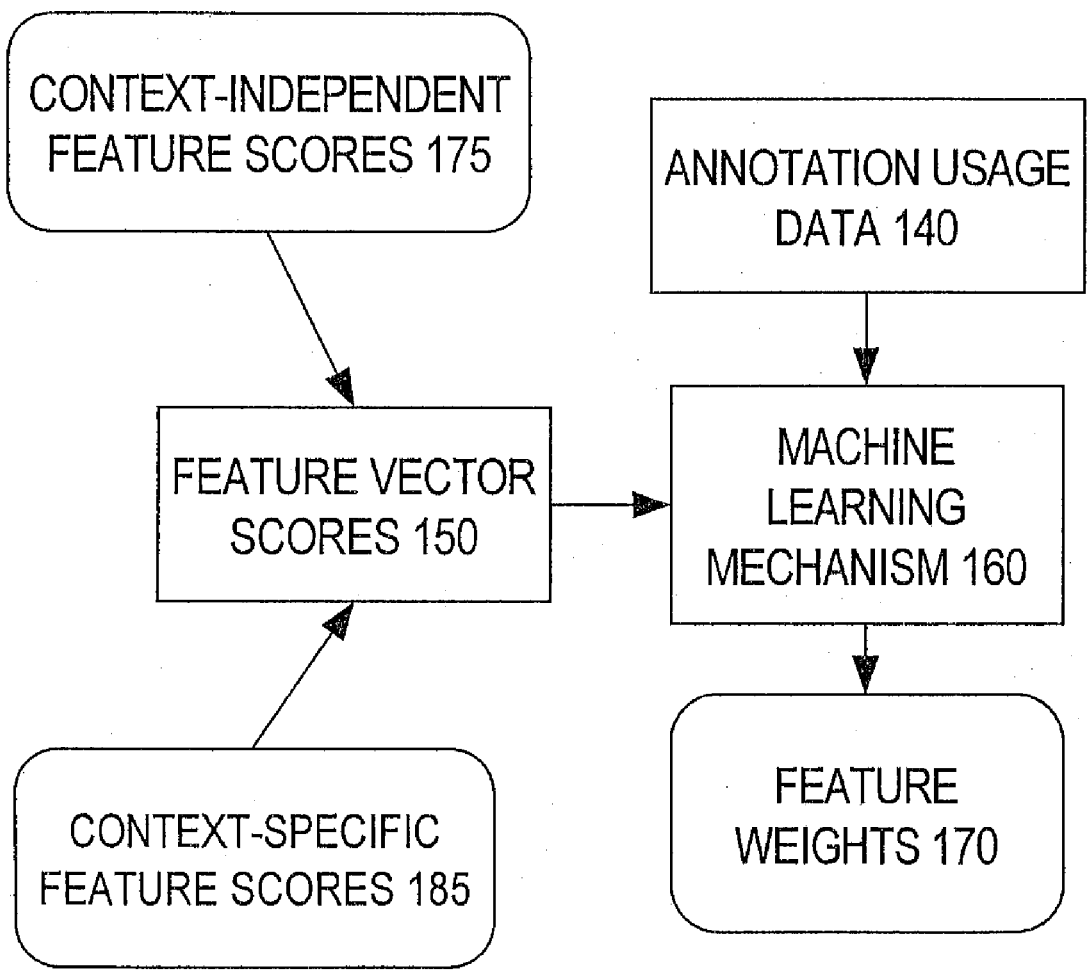
FIG. 2 is a block diagram of a system for generating weights for features based on how well those features predict the likelihood that annotations will be used by users.

Referring to FIG. 2, the feature weights 170 are produced by a machine learning mechanism 160. The feature weights 170 indicate the correlation between (a) features and (b) the likelihood users will make use of annotations. For example, if a particular feature is a good indicator of whether a user will make use of an annotation, then the feature weight of that feature will be high. If a particular feature is not a good indicator whether a user will make use of an annotation, then the feature weight of that feature will be low.

If an entity has a high score for a heavily-weighted feature, it is more likely that an annotation for the entity will be used, and ranking mechanism 120 will rank the entity higher. On the other hand, if an entity has a low score for a heavily-weighted feature, it is less likely that an annotation for the entity will be used, and ranking mechanism 120 will rank the entity lower. When ranking entities, ranking mechanism 120 will give less significance to the scores that the entities have for features that have low weights.

As shall be described in greater detail hereafter, machine learning mechanism 160 generates the feature weights 170 based on annotation usage data 140 and feature vector scores 150 for the entities. The annotation usage data 140 may be collected by recording actual user interaction with annotations contained on pages presented to users.

Identifying Key Concepts

As mentioned above, the problem of determining the most relevant and interesting entities and concepts (the "key concepts") in a given document is of growing importance due to the ever increasing amount of information available in large information repositories, such as the World Wide Web.

However, the problem is not simply one of determining the set of all named entities and phrases in a document—a natural language problem which has been attacked extensively via rules, dictionaries, and machine learning algorithms—but of refining that set to a smaller set of highly relevant and interesting concepts that accurately capture the topic of the document and are interesting to a large base of users. Extracting the key concepts from documents plays a major role in a variety of applications, including but not limited to contextual advertising systems, search engines, and user-centric entity detection systems.

Contextual advertising applications attempt to determine the most relevant textual ads for a given document (e.g. web page), and embed those ads into the document. Typically, such systems first attempt to discover the relevant keywords in a document, and then find the ads that best match the set of keywords. Reducing a document to a small set of key concepts can improve performance of such systems by decreasing their overall latency (processing time) without a loss in relevance.

Text summarization is an important component of Web search engines. Search engines can potentially return a large number of search results (URLs) for a given query, so in addition to each result, a small snippet of text is included that attempts to summarize the contents of the page behind the URL. Users scan these snippets to understand which URLs contain the most relevant results for their queries. Therefore, providing effective summaries via key concepts can increase overall user satisfaction with the search engine. Furthermore, effective web page summarization is critical in handheld and mobile web applications, where the display real estate (screen size) is smaller than in conventional personal computers.

User-centric entity detection systems, where the primary consumer of the detected entities is a human (not a machine), benefit from detecting just the key concepts in document by improving the overall user experience. User-centric entity detection systems not only detect entities and concepts within text (e.g., web pages), but also transform those detected entities into actionable, "intelligent hyperlinks". These hyperlinks provide additional relevant information about the entity in a single-click, e.g. detecting an address and showing a map to it, detecting a product name and showing an ad, etc. In these cases, the quality (not necessarily the quantity) of detected entities matters, since not every single entity or concept is necessarily relevant to the topic of the document, nor is it necessarily interesting. Annotating such irrelevant or uninteresting entities with hyperlinks can be a nuisance and a distraction, and can be likened to spam.

Leveraging Context

Leveraging context in user-centric entity detection systems is discussed in V. von Brzeski, U. Irmak, and R. Kraft. "Leveraging context in user-centric entity detection systems". In Proc. of the 16th Conf. on Information and Knowledge Management, pages 691-700. ACM, 2007 (referred to hereafter as the "Context Leveraging Article"). Specifically, that article describes a technique to measure the quality and utility of user-centric entity detection systems in three core dimensions: the accuracy, the interestingness, and the relevance of the entities it presents to the user. Using such techniques to leverage surrounding context can greatly improve the performance of such systems in all three dimensions by generating a feature vector and for finding concept extensions using search query logs.

Contextual Shortcuts

As mentioned above, systems exist for annotating entities that are detected within documents to allow users to easily access additional information about the entities. Annotations that are added to documents in this manner are referred to as "contextual shortcuts". Contextual shortcut systems provide a framework for entity detection and content syndication. In general, contextual shortcut systems are designed to detect interesting named entities and concepts (the key concepts) in unstructured text, and annotate them with intelligent hyperlinks (shortcuts).

In one embodiment, clicking on a Shortcut results in a small overlay window appearing next to the detected entity, which shows content relevant to that entity, e.g. a map for a place or address, or news/web search results for a person, etc. Such systems may be highly scalable, detecting hundreds of millions of entities per day. The major components of a contextual shortcut platform are described in the Context Leveraging Article.

In general, a sequence of pre-processing steps handles HTML parsing, tokenization, sentence, and paragraph boundary detection. Next, specialized detectors discover entities of various predefined types (e.g. places, persons, organizations, identifiers like URLs, emails, phone numbers, etc.), as well as abstract concepts derived from search engine query logs. Finally, a sequence of post-processing steps handles collision detection between overlapping entities, disambiguation, filtering, and output annotation.

Entity Detection

Before it is possible for ranking mechanism 120 to estimate the relevance and interestingness of detected entities, the entities must be detected by entity detector 106. The techniques described herein for estimating the relevance and interestingness of entities are not limited to any particular technique for detecting entities. Thus, although various detection techniques are described herein, such techniques are merely mentioned for the purpose of explanation, and not by way of limitation.

For example, in one implementation of entity detector 106, entities fall into three types:
1. Pattern based entities (emails, URLs, phones, etc.)
2. Named entities (names of concrete people, places, organizations, products, etc.)
3. Concepts (abstract entities, e.g. "auto-insurance", "science fiction movies", etc.)

Pattern based entities are primarily detected by regular expressions. To provide a level of consistent behavior to the end user, pattern based entities are not subject to any relevance calculations are always annotated and shown to the user. Although tuning of regular expressions is not always easy, regular expressions typically achieve very high accuracy and overall relevance.

Named entities are detected with the help of editorially reviewed dictionaries. The dictionaries contain categorized terms and phrases according to a pre-defined taxonomy. The current system consists of a handful major types, such as people, organizations, places, events, animals, products, and each of these major types contains a large number of sub-types, e.g. actor, musician, scientist, etc. It is possible that a named entity can be a member of multiple types, such as the term jaguar, in which case the entity is disambiguated.

The named location detector (places and street addresses) also uses data-packs that are pre-loaded into memory to allow for high-performance entity detection. The data-packs are used to associate type information and meta-data to detected entities, such as the type information as listed in the entity taxonomy. In the case of locations, the meta-data contained geo-location information (longitude, latitude).

Concepts are detected using data from search engine query logs, thus allowing the system to detect things of interest that go beyond editorially reviewed terms. In FIG. 1, editorially reviewed dictionaries, concepts detected using search engine query logs, and entities detected by a named location detector, are all collectively represented by entity dictionary 112.

These and/or other inputs are used by entity detector 106 to identify entities within individual documents, such as document 108.

Techniques are described hereafter for ranking the identified entities of a document based on interestingness, where interestingness is determined, in part, based on weights 170 assigned to features that correspond to the feature vector scores 150 of the identified entities.

Certain feature vector generation techniques are described in greater hereafter. Additional specific details on a feature vector generation technique are included in the Context Leveraging Article. However, the entity ranking techniques described herein do not assume, are not limited to, any particular feature vector generation technique.

Feature Vector Scores

In one embodiment, a feature vector is created from two auxiliary vectors: a "term vector" and a "unit vector". Given a document, a term vector is generated with a tf*idf score of each term using a term dictionary which contains the term-document frequencies (i.e. from a large web corpus). tf*idf scores are described in G. Salton and C. Buckley. Term Weighting Approaches In Automatic Text Retrieval. Technical report, Ithaca, N.Y., USA, 1987. (hereinafter the "Term Weighting Article").

According to one embodiment, feature vector scores are generated for entities based on a corpus 102 that includes all of the web documents that are indexed by an Internet search engine. Stop-words are removed and the remaining terms' weights are normalized so that the weights are between 0 and 1. The weights of terms that fall under a certain threshold are punished (their tf*idf score is decreased), and the resulting tf*idf scores below another threshold are removed from the term vector.

A unit vector is generated of all the units found in the document. In this context, a unit may simply be a multi-term entity in the query logs which refers to a single concept. Multi-term units are created from single-term units on the basis of mutual-information of user queries. Mutual information helps to identify those terms that frequently co-occur in user queries. Informally, mutual information compares the probability of observing x and y together as a query with the probabilities of observing x and y independent queries.

If there is an association between x and y, then the score I(x, y) will be higher. The weight of each derived unit, the unit score, is proportional to the mutual-information score. Similar to the term vector scores, unit scores are also normalized so that they are between 0 and 1. Again, the weights of units that fall under a certain threshold are punished, and low scoring units are removed.

Finally, the term vector is merged with the unit vector to obtain the feature vector and the final score of the concept is computed. The Context Leveraging Article has more details about how a final score may be computed for each concept.

As an example, consider the following news snippet:

By DAVID ESPO, AP Special Correspondent WASHINGTON

Anti-war Democrats in the Senate failed in an attempt to cut off funds for the Iraq war on Wednesday, a lopsided bipartisan vote that masked growing impatience within both political parties over President Bush's handling of the four-year conflict.

For this news snippet, the top 5 concepts with their feature vector scores may be:

```
<termvector id="concept">
<item term="david espo" weight="1.4403">
<item term="special correspondent" weight="1.2075">
<item term="iraq war" weight="1.1833">
<item term="president bush" weight="1.1549">
<item term="political parties" weight="0.6147">
...
</termvector>
```

Determining Feature Vector Scores

According to one embodiment, the problem of determining the relevance of identified entities is split into two parts: (a) determining whether the identified entity is relevant to the given context, and (b) determining whether the identified entity is interesting outside of the context. Features that indicate whether an identified entity is relevant to a given context are referred to herein as context-specific features. Features that indicate whether an identified entity is interesting outside of the context are referred to herein as context-independent features.

Once entities that are contained in documents within corpus 102 are identified, a context-independent set of feature scores may generated for each entity. In addition to the context-independent feature scores of an entity, one or more context-specific feature scores may be generated for each identified entity. The context-independent feature scores 175 for an entity and the context-specific feature scores 185 for the entity are collectively referred to as the "feature vector" of the entity. In FIG. 1, feature vector scores 150 represents the features vectors generated for the entities identified in document 108.

For relevance, a model is constructed for each entity and concept. This model is used by relevance estimator 180 at runtime to compute a relevance score for a given entity with respect to a (new) given context. For interestingness, a single model is built that, given a set of entities, returns the entities ranked in decreasing order of interestingness. The relevance score computed by relevance estimator 180 for each entity can, by itself, be used by ranking mechanism 120 to rank the entities. In addition, the relevance score can also serve as a feature in an overall (learned) model for interestingness and relevance. In one embodiment, the final ranking of the identified entities is determined by this overall model.

Any one of a variety of tools may be used by ranking mechanism 120 to learn a ranking function between pairs of instances. Tools that may be used for this purpose include, but are not limited to, Ranking SVM, provided in SVMlight Library, and LIBLINEAR—A Library for Large Linear Classification. Ranking SVM is described in T. Joachims, Optimizing Search Engines Using Click-Through Data, In Proc. of the eighth int. conf. on Knowledge discovery and data mining, pages 133-142, New York, N.Y., USA, 2002. ACM. The techniques used by LIBLINEAR are described in C.-J. Hsieh, K.-W. Chang, C.-J. Lin, S. S. Keerthi, and S. Sundararajan. A dual coordinate descent method for large-scale linear SVM. ICML 2008, and C.-J. Lin, R. C. Weng, and S. S. Keerthi. Trust region Newton method for large-scale logistic regression. Journal of Machine Learning Research 9 (2008), 627-650.

In one embodiment, each instance consists of the entity/concept along with the entity/concept's associated features, and the label of each instance is its CTR value. The specific features used in one embodiment, as well as details regarding the machine learning approach, including data pre-preprocessing (training and test) are described in greater detail hereafter.

Feature Space

A large set of general concepts can be extracted from many documents. However, not all concepts are equally relevant. Thus, the set of all identified concepts are treated as a candidate set, and the candidate set is ranked based, in part, on weights that are established based on click-through data, to identify "key concepts". Such key concepts would be highly interesting in general (independent of the context) and/or highly relevant in the context.

In one embodiment, a feature vector is defined to capture the interestingness of a concept, and the contributions of the individual fields are determined through machine learning techniques.

With interestingness, the system uses various context-independent features as a measure of whether a concept would be appealing to a user in general. Note that the scores of the context-independent features of a concept may be high even when the concept is not relevant in the context. According to one embodiment, the context-independent features that are used to estimate the interestingness of a concept, include:

1 freq exact
2 freq similar
3 phrase freq exact
4 phrase freq similar
5 freq all
6 unit score
7 searchengine regular
8 searchengine phrase
9 concept size
10 largest idf
11 sum idf
12 number of chars
13 subconcepts
14 high level type
15 exact type
16 wiki word count This list of context-independent features includes features based on query logs, text-based features, taxonomy-based features, as well as other features. It should be noted that this list of features is merely exemplary. Other embodiments may use more, fewer, or different features.

Features Based on Query Logs

In the feature list identified above, the first feature "freq exact" is derived from the query logs. Specifically, freq exact represents the number of queries that are exactly same as the concept. If a query and a concept have a relatively smaller similarity (above 0.75 in the experiments), then they are considered to be similar. The second feature "freq similar" is the number of queries that are similar to the concept. The features "freq exact" and "freq similar" consider both queries and concepts as a bags of words, and do not require any ordering.

In contrast, "phrase freq exact" is the number of phrase queries that are exactly same as the concept. The "phrase freq similar" feature is the number of phrase queries that are similar to the concept.

All the cosine measure and ordering restrictions are removed in the definition of "freq all", which is the number of all queries that contain concept terms. The "unit score" of the concept, which is derived from query logs, is the mutual information of the terms in the concept.

The "Search Engine Result Pages" is the number of result pages returned by the search engine as a feature. The feature serves as an estimation on the specificity of the concept. Very specific concepts would return fewer results than the more general concepts.

The "searchengine regular" field is the number of result pages returned by the search engine when the concept is submitted as a regular query.

The "searchengine phrase" field is the number of result pages returned by the search engine when the concept is submitted as a phrase query.

Search engine query logs typically provide a strong correlation with the interestingness of a concept. In other words, if a concept is interesting in general, there should be a quite large number of queries submitted to an engine for that concept. However, the use of query logs might be misleading for some concepts since search engines receive large number of navigational and transactional queries in addition to informational queries.

Another difficulty with the query logs is that they are usually very short and most of them contain less than four terms. So many of these short queries might actually be intended for the same concept although they look different. To account for this, in one embodiment, if a query and a concept have a very high cosine similarity (above 0.97 in the experiments), then the query and concept are considered to be an exact match.

Text-Based Features

The concept size, sum idf, number of chars, and subconcepts are all text based features. Specifically, "concept size" refers to the number of terms in the concept. Largest idf refers to the largest idf value when all terms in the concept are considered individually. The "sum idf" feature is the sum of idf values of the terms in the concept. The "number of chars" feature is the number of characters in the concept. The "subconcepts" feature represents the number of subconcepts contained in the concept that have more than two terms and have a unit score of larger than 0.25.

Taxonomy-Based Features

In one embodiment, if a concept is found in one of the editorially maintained lists, then the "type" of the concept is used as a feature. Specifically, the "high level type" feature indicates whether the general category of the concept (such as place, person, organization, etc). The "exact type" feature indicates the exact type of the concept in the taxonomy (such as person.government.world leader, etc).

Other Features

A feature vector of an entity may include other features instead of or in addition to the query log features, text-based features, and taxonomy based features described above. For example, in one embodiment, the feature vector of a concept includes features based on Wikipedia. Specifically, as Wikipedia continues to grow, it is possible to find entries about many concepts in Wikipedia. Thus, according to one embodiment, the "wiki word count" feature indicates the number of words in the Wikipedia article returned for the concept (0 is used if no article exists).

Context-Specific Features

Relevance is quite important in ranking the concepts in a given context. Clearly, text summarization techniques would not be helpful if the summaries returned were not relevant to the overall content. In user-centric detection entity detection systems, relevance plays an important role and those concepts with low relevance usually do not attract users to take further action unless they are extremely interesting.

According to one embodiment, a mining approach is used by relevance estimator 180 to obtain good relevance scores for the identified entities 116 that are contained in document 108. The relevance score generated by content relevance estimator 180 plays an important role, in conjunction with the context-independent feature scores, in the ranking of the candidate concepts.

As an example of how relevance estimator 180 may generate a relevance score for a context, assume that a set of relevant context keywords has been constructed for that concept in advance. For example, assume that the top hundred most distinctive terms have been extracted from contexts in which the concept was known to be relevant. Given a new context containing that concept, relevance estimator 180 finds out the relevancy of the concept in the new context based on the co-occurrences of the pre-mined keywords and the given concept in the context. If none of the keywords occur, relevance estimator 180 concludes that the concept is not relevant in the context, and it is likely that the model will rank that concept much lower based on this fact.

Mining Relevant Keywords for Each Concept

As mentioned above, in one embodiment, relevance estimator 180 determines the relevance score of a concept to new context (e.g. document 108) by comparing terms that are relevant to that concept (entity-related terms 125) with terms contained in the new context. In order to perform the comparison, the entity-related terms 125 must be determined for each concept.

For the purpose of explanation, it shall be assumed that the set of concepts of is size n: $C=\{c_1, c_2, \ldots, c_n\}$ (1)

For each concept $c_i$ in this set, the system mines the top m (e.g. top 100) relevant context keywords, and their scores: relevantTerms$_i=\{(t_{i,1}, s_{i,1}), \ldots, (t_{i,m}, s_{i,m})\}$ (2)

In this context, the score indicates the importance of the relevant term for the concept, i.e. the confidence about this term.

As mentioned above, for concept $c_i$ the relevant keywords $\{t_{i,1}, \ldots, t_{i,m}\}$ are mined from contexts in which the given concept is presumed to be relevant. In one embodiment, the contexts in which the concept is presumed to be relevant come from three sources: (a) search engine result snippets, (b) a tool for query refinement, and (c) related query suggestions. No manual (human) analysis of relevance need be performed.

Intuitively, the more frequently the term appears in those contexts, the higher this score should be. Similarly, the more important the term is in general, the higher this score should be.

Search Engine Snippets

For the task of mining the relevant keywords for a given concept $c_i$ in C, search engine snippets may be used. These short text strings are constructed from the result pages by the engine, and they usually provide a good summary of the target page since they help users in making the decision of whether to visit the target page or not. For example, a concept may be submitted to retrieve corresponding snippets, and the first hundred results may be used for the relevance score calculation.

In one embodiment, the returned snippets a treated as a single document. For each unique term that appears in the snippet document, its tf*idf score is computed, where tf stands for the term frequency and idf stands for the inverse document frequency (see the Term Weighting Article). Then, the top m=100 terms are chosen based on this score, and used as the relevant keywords for concept $c_i$.

So for term $t_{i,j}$, score $s_{i,j}$ is defined to be tf*idf value. This score can successfully provide the two desired features, which are discussed above, through tf and idf values.

Query Refinement Tool

Tools exist that assist users to augment or replace their queries by providing feedback terms. The feedback terms are generated using a pseudo-relevance feedback approach by considering the top 50 documents in a large collection, based on factors such as count and position of the terms in the documents, document rank, occurrence of query terms within the input phrase, etc.

When such a tool is queried, it returns the top N feedback concepts for the submitted query. In order to obtain the set relevant terms i for concept $c_i$, the same approach may be used as was described above for snippets. Specifically, a single document may be constructed from the concepts returned by the tool for concept $c_i$, and scores $s_{i,j}$ can be computed based on the tf*idf values.

Related Query Suggestions

Search engine query suggestions may also be used as a resource for obtaining the terms related to a concept. A related-query suggestion service provides query suggestions related to the submitted query. To use the query suggestions to obtain related terms for a concept, the concept $c_i$ is submitted to the query suggestion service to obtain up to 300 suggestions. In one embodiment, the query frequencies of the suggestions (i.e how many times this suggestion was submitted to the engine as a query) are also obtained. Note that each unique term seen in these suggestions may appear in multiple suggestions (say, it appears in k suggestions).

Based on the query frequencies of these suggestions, the score of the term is defined to be $P_k$ i=1 ln(query freq$_i$_idf (term)). The terms are sorted based on their scores, and the top m=100 terms are chosen to be used as the relevant keywords for concept $c_i$.

Low Quality Concepts

Ideally, those concepts that are very general or have low quality should almost never get a high relevance score in any context. The approach for determining relevance described above addresses this issue implicitly. For example, assume that search engine snippets are being used as the relevant contexts for a particular concept. If the concept is very specific, some distinctive terms (that have high idf scores) occur very often in the snippets and will have high tf scores. Consequently, such terms end up having quite large final (tf*idf) scores. On the other hand, if the concept is very general or has low quality, then the mined relevant keywords are usually very sparse, and no such clustering occurs, so the mined relevant terms usually end up having small final (tf*idf) scores.

Annotation Usage Data

As illustrated in FIG. 1, when determining the ranking of entities, ranking mechanism 120 applies feature weights 170 to the feature vector scores 150 of the entities. As illustrated in FIG. 2, the feature weights are generated by a machine learning mechanism 160 based on annotation usage data 140.

According to one embodiment, annotation usage data is collected by presenting pages with annotated entities to users, and capturing the user interaction with the pages. For example, in one embodiment, records are generated to indicate how many times a particular annotated page was presented, and how many times a user made use of each of the annotations contained therein.

In one embodiment, annotations are in the form of hyperlinks. In such an embodiment, a user "makes use" of an annotation by clicking the hyperlink to access the information to which the hyperlink points. Under these circumstances, the "usage data" for annotations takes the form of "click-through" data of the hyperlinks presented by the page. However, hyperlinks are merely one way in which identified entities may be annotated, and click-through data is merely one way in which use of the annotations may be recorded.

In alternative embodiment, annotations may take the form of pop-ups that are activated when a user-controlled cursor hovers over a named entity. In such an embodiment, the annotation usage information would indicate which annotated entities were "hovered over", rather than click-through information. For the purpose of explanation, embodiments shall be described in which the annotation-usage data is "click-through" data. However, the techniques described herein are not limited to such embodiments.

Using Annotation Usage Data to Measure Interestingness

Techniques are described hereafter for determining the most interesting and relevant set of entities and concepts in a document (the key concepts), using implicit user feedback in the form of click data collected while users interact with pages containing annotated entities. Specifically, in one embodiment, given a document (e.g. document 108) and a candidate set of entities extracted "naively" from the document (e.g. identified entities 116), ranking mechanism 120 will return the entities ranked in decreasing order of interestingness and relevance. An application, such as document annotator 114, can then choose the top N entities from this ranked list, and only annotate those top N entities within the document.

The fact the users previously made use of annotations associated with identified entities in a particular document is a good measure of relevance and interestingness of those entities to readers of that particular document, since each click on an entity or concept means that a user took a detour from his or her current task to investigate the entity or concept further. Thus, the more relevant an entity is to the topic of the document and the more interesting it is to the general user base, the more clicks that annotation associated with the entity will ultimately get.

In one embodiment, the click data used to rank identified entities for a document is in the form of click-through-rate (CTR) data mined from user interactions with annotated entities on pages provided to users of a service. As shall be described in greater detail below, the machine learning mechanism 160 uses CTR data, along with the context surrounding the entity, in a machine learning approach to build a ranking function that ranks a set of entities found in a document. The feature space includes attributes related to the relevance of an entity in a context, as well as attributes related to how interesting an entity is to the general base of users. Features related to relevance are primarily derived from analysis of document corpora, whereas features related to interestingness are derived from analysis of search query logs.

In one embodiment, an entity is considered to be relevant to a document if a shortened synopsis of the document cannot leave the entity out without losing a key idea. Interestingness can be thought of as a measure of how likely a reader is to want further information regarding the entity (either see a map of a place, search/news results for a person, etc.). Combined, relevance and interestingness determine the likelihood of a person actually clicking on the entity. For example, consider the following snippet:

> President Bush's position was similar to that of New York Sen. Clinton, who argued at a debate with Obama last week in Texas that there should be no talks with Cuba until it makes progress on releasing political prisoners and improving human rights.

In the above snippet, President Bush, Sen. Clinton, Obama, and Cuba are all relevant and interesting entities to the reader of the above text. However, Texas is not at all relevant to the topic of the snippet (President Bush's, Sen Clinton's, and Obama's positions on talks with Cuba), and even though it may be interesting to some users, the click numbers for Texas will probably be much lower compared to the other entities.

Obtaining Annotation Usage Data

According to one embodiment, the entities that are identified in a document (e.g. identified entities 116) are ranked by ranking mechanism 120 based on feature vector scores 150, and feature weights 170. The feature weights 170 are derived from user click data (represented in FIG. 2 as annotation usage data 140). As mentioned above, Contextual Shortcuts may be used to annotate documents. When presented with annotated documents, users may make use of the annotations. In one embodiment, click through data that records the user interactions with the annotated entities is stored, and is subsequently used by machine learning mechanism 160 to generate the feature weights 170 used by ranking mechanism 120 as a basis for performing the ranking.

Specifically, in one embodiment, each news story presented by a news service is pre-processed via Contextual Shortcuts prior to being published. The interesting entities and concepts in each story (as determined by the Contextual Shortcuts system) are annotated with Shortcuts (intelligent hyperlinks). In randomly sampled news stories (due to data volume constraints), the Shortcuts also include tracking information that allows the system to capture whether a reader of the story actually clicked on the annotated entity. This click data is aggregated and is mined. In one embodiment, the click data is used to provide the following reports on a weekly basis for each sampled news story:

- the text of the news story
- a list of the entities annotated in the story, along with metadata for each entity (taxonomy type, position in text)
- the number of times each entity was viewed
- the number of times each entity was clicked For a given news story, the number of times each entity was viewed on that page is the same for all entities on that page, and that number equals the number of times the news story itself was viewed.

According to one embodiment, the view and click data collected in this manner are used as training and test data in a machine learning system. Based on the click data, machine learning system learns a ranking function which orders a given candidate set of entities by their interestingness and relevance based on the click data.

In one embodiment, click-through-rate (CTR), defined as the number of clicks of an annotated entity divided by the number of views of the document containing the annotated entity, is a proxy for interestingness and relevance, based on the assumption that entities receiving higher CTR values are more interesting and relevant to users.

Generating Feature Weights Based on Annotation Usage Data

As mentioned above, machine learning techniques are used by machine learning mechanism 160 to learn the best rules (feature weights 170) for rank the entities relative to the context of a particular document. Specifically, for each document, the machine learning mechanism 160 is fed (a) the feature vector scores 150 for each identified entity in the document, and (b) the annotation usage data 140 that indicates how frequently the annotations associated with the entities were used when presented to users. According to one embodiment, the feature vector scores 150 fed to the machine learning mechanism 160 include both context-independent feature scores 175 and context-specific feature scores 185.

Based on this information, machine learning mechanism 160 is able to determine how strongly each feature correlates with the click-through-rate of annotations. For example, assume that entities that have high wiki word counts have high click-through-rates, and that entities with low wiki word counts have click-through-rates. Based on the strong correlation between the wiki word count feature and click-through-rates, the wiki word count feature may be assigned a relatively heavy weight by machine learning mechanism 160.

On the other hand, some features may have very little correlation with click-through-rates. For example, the "number of chars" feature may have no correlation with click-through-rates. That is, the number of characters that entities have may have no correlation with the click-through-rate of annotations associated with the entities. Consequently, the weight assigned by machine learning mechanism 160 to the "number of chars" feature may be low.

When determining how to rank entities within a document, the entities are not simply ranked based on their feature vector scores. Instead, the weights derived by machine learning mechanism 160 are applied to the feature vector scores to create a set of weighted feature vector scores. The weighted feature vector scores for each entity may then be used to calculate a final weighted score for the entity. Ranking mechanism 120 may then rank the identified entities based on the final weights thus derived.

Framework

According to one embodiment, building the interestingness vector and mining relevant keywords for concepts are performed through preprocessing, and are therefore offline procedures. That is, they are performed before a request is made that requires ranking mechanism 120 to rank entities for a particular document. However, in one embodiment, the steps of detecting and ranking the concepts in a given document are performed in real-time in response to requests for documents that are to be annotated. Therefore, the process of detecting and ranking concepts in a document needs to be quite efficient.

For the purpose of explanation, assume that 1 million concepts are supported, and that the feature vectors for the concepts have the 16 concept-independent features described above. Under these circumstances, the scores for the 16 concept-independent features are computed offline for each concept. Normalization may be employed to fit each field to a single byte (this would cause a minor decrease in granularity). Consequently, the context-independent scores for 1 million concepts would cost 16 MB in memory. Using hash tables, the context-independent scores for the detected concepts can be retrieved in constant time.

However, to generate relevance scores using the techniques described herein, it may be necessary to store up to a hundred relevant keywords, with their scores, for each concept. In one embodiment, the relevant keywords are represented by unique ids (perfect hashes). Consequently, for each concept up to hundred ids (numbers), and their scores, are stored. In the process of computing the relevance score, the system uses a global hash table which simply maps a given term to its id (if that term is used by at least one concept).

Hardware Overview

Figure 3:
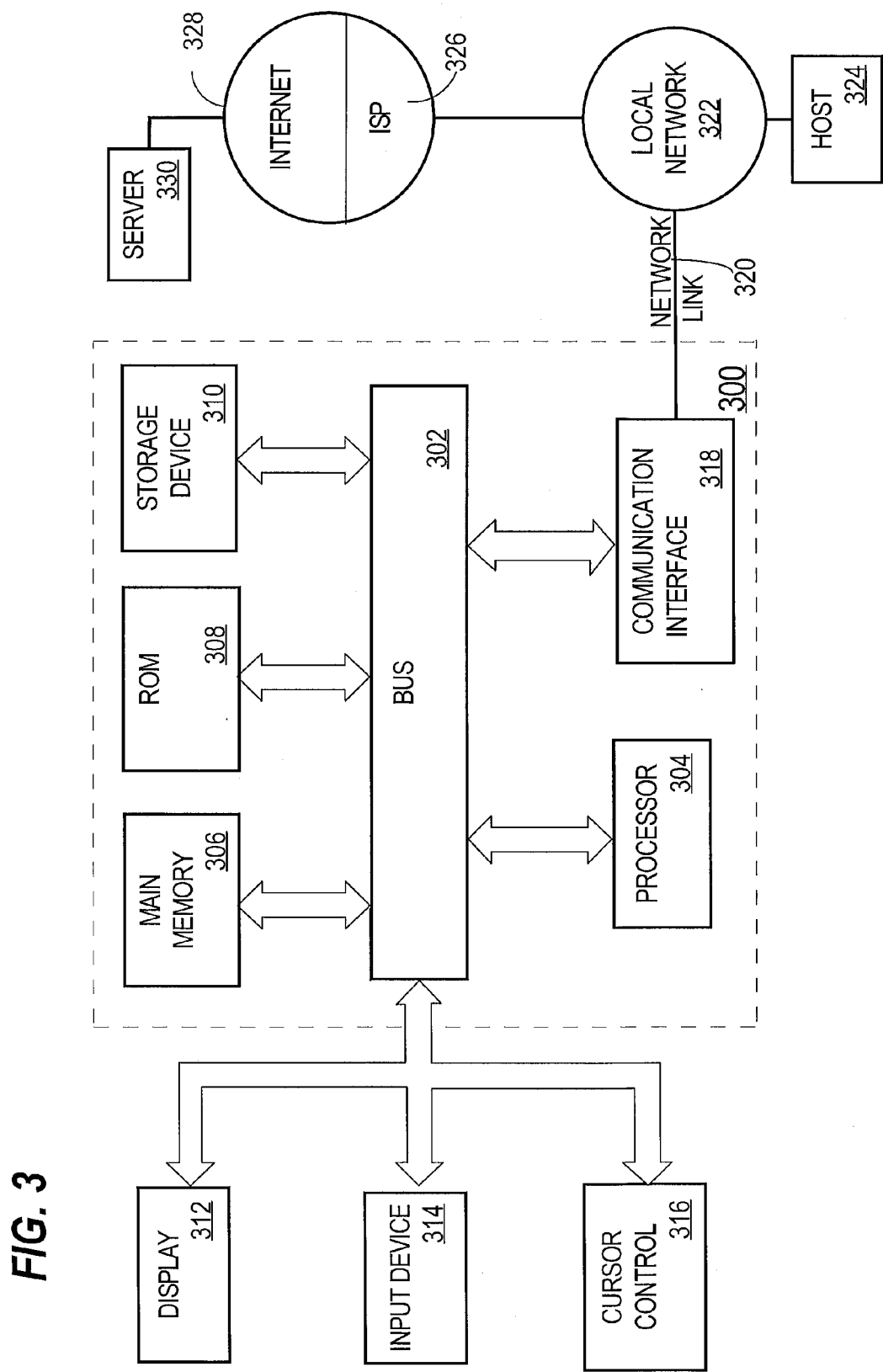
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other context-independent storage device coupled to bus 302 for storing context-independent information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   collecting usage data that indicates how frequently users interact with annotations for entities that are referenced in documents that are presented to the users;
   based at least in part on the usage data, generating weights for features that are associated with the entities that are referenced in the documents;
   wherein a particular weight of a particular feature is based at least in part on how frequently users interact with annotations of entities having the particular feature;
   identifying a set of identified entities within a document;
   determining a ranking for the identified entities that belong to said set of identified entities based, at least in part, on
   (a) feature scores for each of the identified entities, wherein the feature scores correspond to features associated with the identified entities, wherein the particular feature is associated with at least one of the identified entities; and
   (b) weights, including the particular weight, for the features that are associated with the identified entities;
   based at least in part on the ranking, automatically selecting a subset of the identified entities for annotation, wherein the subset includes fewer than all of the identified entities;
   automatically generating an annotated version of the document by, for each entity in the subset, adding to the document a control for displaying additional information about the entity, wherein the additional information about the entity and the control associated with the entity were not in the document before the step of automatically generating the annotated version of the document;
   wherein at least the steps of generating the weights, determining the ranking, automatically selecting the subset, and automatically generating the annotated version are performed by one or more computing devices.

2. The method of claim 1 wherein a particular annotation for a particular entity comprises a hyperlink added to the document, wherein the hyperlink links to additional information about the particular entity, and wherein collecting usage data is performed by storing click-through information that indicates which hyperlinks, within the documents present to the users, were activated.

3. The method of claim 1, wherein the annotated version of the document includes controls for displaying additional information only for those identified entities that belong to the subset and not for identified entities that do not belong to the subset.

4. The method of claim 1, further comprising visually distinguishing an identified entity that ranks higher in the ranking from an identified entity that ranks lower in the ranking.

5. The method of claim 1 wherein the features that are associated with the entities contained in the documents include one or more context-independent features, and one or more context-dependent features.

6. The method of claim 5 wherein a score for at least one context-dependent feature is computed for a combination of a given entity and a given document based at least in part on a comparison between terms associated with the given entity and terms contained in the given document.

7. The method of claim 6 further comprising the step of determining the terms associated with the given entity based, at least in part, on search engine result snippets associated with the given entity.

8. The method of claim 6 further comprising the step of determining the terms associated with the given entity based, at least in part, on related query suggestions generated based at least in part on the given entity.

9. The method of claim 1 wherein automatically generating the annotated version is performed in response to a request for the document, and wherein the annotated version is provided in response to the request.

10. The method of claim 1 wherein the step of generating the weights includes using a machine learning mechanism to generate the weights based at least in part on a correlation between (a) feature scores that correspond to the features associated with the entities referenced in the documents, and (b) click-through-rates, indicated by the usage data, for the annotations of the entities referenced in the documents.

11. A method for annotating a document, the method comprising:
generating a weight for a particular feature of entities, wherein the weight indicates how well the particular feature predicts whether annotations associated with the entities will be used;
identifying a set of entities within the document;
generating a first set of scores by generating, for each entity in the set, a score for said particular feature;
generating a second set of scores based at least in part on said first set of scores and said weight;
establishing a ranking of entities in the set of entities based, at least in part, on the second set of scores;
based at least in part on the ranking, automatically selecting a subset of the set of entities for annotation, wherein the subset includes fewer than all of the identified entities;
automatically generating an annotated version of the document by, for each entity in the subset, adding to the document a control for displaying additional information about the entity, wherein the additional information about the entity and the control associated with the entity were not in the document before the step of automatically generating the annotated version of the document;
wherein at least the steps of generating the weight, generating the second set of scores, automatically selecting the subset, and automatically generating the annotated version are performed by one or more computing devices.

12. The method of claim 11 wherein the weight is generated based at least in part on click-through-data collected by monitoring how frequently users interact with documents that include annotated entities.

13. One or more non-transitory computer-readable storage media storing instructions, the instructions including instructions which, when executed by one or more processors, cause the one or more processors to perform the steps of:
collecting usage data that indicates how frequently users interact with annotations for entities that are referenced in documents presented to the users;
based at least in part on the usage data, generating weights for features that are associated with the entities referenced in the documents;
wherein a particular weight of a particular feature is based at least in part on how frequently users interact with annotations of entities having the particular feature;
identifying a set of identified entities within a document;
determining a ranking for the identified entities that belong to said set of identified identities based, at least in part, on
(a) feature scores for each of the identified entities, wherein the feature scores correspond to features associated with the identified entities, wherein the particular feature is associated with at least one of the identified entities; and
(b) weights, including the particular weight, for the features that are associated with the identified entities;
based at least in part on the ranking, automatically selecting a subset of the identified entities for annotation, wherein the subset includes fewer than all of the identified entities;
automatically generating an annotated version of the document by, for each entity in the subset, adding to the document a control for displaying additional information about the entity, wherein the additional information about the entity and the control associated with the entity were not in the document before the step of automatically generating the annotated version of the document.

14. The one or more non-transitory computer-readable storage media of claim 13 wherein a particular annotation for a particular entity comprises a hyperlink added to the document, wherein the hyperlink links to additional information about the particular entity, and wherein collecting usage data is performed by storing click-through information that indicates which hyperlinks, within the documents present to the users, were activated.

15. The one or more non-transitory computer-readable storage medium of claim 13, wherein the annotated version of the document includes controls for displaying additional information only for those identified entities that belong to the subset and not for identified entities that do not belong to the subset.

16. The one or more non-transitory computer-readable storage media of claim 13, further comprising visually distinguishing an identified entity that ranks higher in the ranking from an identified entity that ranks lower in the ranking.

17. The one or more non-transitory computer-readable storage media of claim 13 wherein the features that are associated with the entities contained in the documents include one or more context-independent features, and one or more context-dependent features.

18. The one or more non-transitory computer-readable storage media of claim 17 wherein a score for at least one context-dependent feature is computed for a combination of a given entity and a given document based at least in part on a comparison between terms associated with the given entity and terms contained in the given document.

19. The one or more non-transitory computer-readable storage media of claim 18 further comprising instructions for determining the terms associated with the given entity based, at least in part, on search engine result snippets associated with the entity.

20. The one or more non-transitory computer-readable storage media of claim 18 further comprising instructions for determining the terms associated with the given entity based, at least in part, on related query suggestions generated based at least in part on the given entity.

21. The one or more non-transitory computer-readable storage media of claim 13 wherein the step of automatically generating the annotated version is performed in response to a request for the document, and wherein the annotated version is provided in response to the request.

22. The one or more non-transitory computer-readable storage media of claim 13 wherein the step of generating the weights includes using a machine learning mechanism to generate the weights based at least in part on a correlation between (a) feature scores that correspond to the features associated with the entities referenced in the documents, and (b) click-through-rates, indicated by the usage data, for the annotations of the entities referenced in the documents.

23. One or more non-transitory computer-readable storage media storing instructions, the instructions including instructions which, when executed by one or more processors, cause the one or more processors to perform the steps of:
  generating a weight for a particular feature of entities, wherein the weight indicates how well the particular feature predicts whether annotations associated with the entities will be used;
  identifying a set of entities within a document;
  generating a first set of scores by generating, for each entity in the set, a score for said particular feature;
  generating a second set of scores based at least in part on said first set of scores and said weight;
  establishing a ranking of the entities in the set of entities based, at least in part, on the second set of scores;
  based at least in part on the ranking, automatically selecting a subset of the set of entities for annotation, wherein the subset includes fewer than all of the identified entities;
  automatically generating an annotated version of the document by, for each entity in the subset, adding to the document a control for displaying additional information about the entity, wherein the additional information about the entity and the control associated with the entity were not in the document before the step of automatically generating the annotated version of the document.

24. The one or more non-transitory computer-readable storage media of claim 23 wherein the weight is generated based at least in part on click-through-data collected by monitoring how frequently users interact with documents that include annotated entities.

25. The method of claim 1 wherein the step of generating the weights includes generating the particular weight based at least in part on (a) how frequently users hover over annotations of entities having the particular feature, and (b) how frequently users click through annotations of entities having the particular feature.

26. The one or more non-transitory computer-readable storage media of claim 13 wherein the step of generating the weights includes generating the particular weight based at least in part on (a) how frequently users hover over annotations of entities having the particular feature, and (b) how frequently users click through annotations of entities having the particular feature.

27. The method of claim 1, wherein automatically generating the annotated version is performed before a request for the document is received, storing the annotated version until the request is received, and providing the annotated version in response to the request.

28. The method of claim 1 wherein a particular annotation for a particular entity comprises a pop-up interface added to the document, wherein the pop-up interface, when hovered over by a cursor, displays additional information about the particular entity in a pop-up, and wherein collecting usage data is performed by storing annotation usage information that indicates which entities, within the documents present to the users, were hovered over.

29. The method of claim 1, wherein generating weights for features that are associated with entities that are referenced in the documents comprises generating weights for features of feature vectors that are associated with the entities that are referenced in the documents, and wherein the feature scores for each of the identified entities comprise feature vector scores that correspond to features in feature vectors associated with the identified entities, wherein the particular feature is in at least one feature vector associated with at least one of the identified entities, and wherein the weights for the features that are associated with the identified entities comprise weights for the features in the feature vectors that are associated with the identified entities.

30. The one or more non-transitory computer-readable storage media of claim 13, wherein the instructions, when executed by the one or more processors, cause the one or more processors to perform automatically generating the annotated version before a request for the document is received, storing the annotated version until the request is received, and providing the annotated version in response to the request.

31. The one or more non-transitory computer-readable storage media of claim 13, wherein a particular annotation for a particular entity comprises a pop-up interface added to the document, wherein the pop-up interface, when hovered over by a cursor, displays additional information about the particular entity in a pop-up, and wherein the instructions, when executed by the one or more processors, cause the one or more processors to perform collecting usage data by storing annotation usage information that indicates which entities, within the documents present to the users, were hovered over.

32. The one or more non-transitory computer-readable storage media of claim 13, wherein the instructions, when executed by the one or more processors, cause the one or more processors to perform generating weights for features that are associated with entities that are referenced in the documents by generating weights for features of feature vectors that are associated with the entities that are referenced in the documents, and wherein the feature scores for each of the identified entities comprise feature vector scores that correspond to features in feature vectors associated with the identified entities, wherein the particular feature is in at least one feature vector associated with at least one of the identified entities, and wherein the weights for the features that are associated with the identified entities comprise weights for the features in the feature vectors that are associated with the identified entities.

* * * * *